United States Patent
Lee et al.

(10) Patent No.: US 11,897,229 B2
(45) Date of Patent: Feb. 13, 2024

(54) ALUMINUM ALLOY-PLATED STEEL SHEET HAVING EXCELLENT WORKABILITY AND CORROSION RESISTANCE AND METHOD FOR MANUFACTURING SAME

(71) Applicant: POSCO, Pohang-si (KR)

(72) Inventors: Suk-Kyu Lee, Gwangyang-si (KR); Hyeon-Seok Hwang, Gwangyang-si (KR); Myung-Soo Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/784,729

(22) PCT Filed: Dec. 18, 2020

(86) PCT No.: PCT/KR2020/018692
§ 371 (c)(1),
(2) Date: Jun. 13, 2022

(87) PCT Pub. No.: WO2021/125888
PCT Pub. Date: Jun. 24, 2021

(65) Prior Publication Data
US 2023/0012544 A1 Jan. 19, 2023

(30) Foreign Application Priority Data
Dec. 20, 2019 (KR) .................. 10-2019-0172362

(51) Int. Cl.
*B32B 15/01* (2006.01)
*C23C 2/28* (2006.01)
(Continued)

(52) U.S. Cl.
CPC ............ *B32B 15/012* (2013.01); *C22C 21/02* (2013.01); *C22C 21/10* (2013.01); *C22C 38/02* (2013.01);
(Continued)

(58) Field of Classification Search
None
See application file for complete search history.

(56) References Cited

U.S. PATENT DOCUMENTS

2016/0047018 A1  2/2016 Morimoto et al.
2019/0010597 A1  1/2019 Kim et al.
(Continued)

FOREIGN PATENT DOCUMENTS

EP  2980260 A1  2/2016
EP  3845682 A1  7/2021
(Continued)

OTHER PUBLICATIONS

Extended European Search Report dated Sep. 26, 2022 issued in European Patent Application No. 20903396.8.
(Continued)

*Primary Examiner* — Daniel J. Schleis
(74) *Attorney, Agent, or Firm* — Morgan, Lewis & Bockius LLP (57) ABSTRACT

The present disclosure relates to an aluminum alloy-plated steel sheet having excellent workability and corrosion resistance and a method for manufacturing the same, and more particularly, to an aluminum alloy-plated steel sheet preventing microcracks generated during hot forming and has excellent seizure resistance and corrosion resistance, and a method for manufacturing the same.

12 Claims, 2 Drawing Sheets

(51) Int. Cl.
- *C22C 21/02* (2006.01)
- *C22C 21/10* (2006.01)
- *C22C 38/02* (2006.01)
- *C22C 38/04* (2006.01)
- *C22C 38/14* (2006.01)
- *C23C 2/12* (2006.01)
- *C23C 2/40* (2006.01)
- *C23C 2/26* (2006.01)

(52) U.S. Cl.
CPC .............. *C22C 38/04* (2013.01); *C22C 38/14* (2013.01); *C23C 2/12* (2013.01); *C23C 2/26* (2013.01); *C23C 2/261* (2022.08); *C23C 2/29* (2022.08); *C23C 2/40* (2013.01); *B32B 2307/718* (2013.01); *B32B 2307/732* (2013.01)

(56) References Cited

U.S. PATENT DOCUMENTS

| | | | |
|---|---|---|---|
| 2021/0008837 A1 | 1/2021 | Hwang et al. | |
| 2021/0348257 A1* | 11/2021 | Lee | C23C 2/40 |
| 2023/0026159 A1* | 1/2023 | Lee | C23C 2/261 |

FOREIGN PATENT DOCUMENTS

| | | | |
|---|---|---|---|
| JP | H11-350164 A | | 12/1999 |
| JP | 2010-018860 A | | 1/2010 |
| JP | 2012-012649 A | | 1/2012 |
| JP | 2014-148715 A | | 8/2014 |
| JP | 2019-504204 A | | 2/2019 |
| JP | 2019-073778 A | | 5/2019 |
| KR | 10-1997-0043250 A | | 7/1997 |
| KR | 100256370 | * | 5/2000 |
| KR | 10-2015-0133835 A | | 11/2015 |
| KR | 10-2018-0022928 A | | 3/2018 |
| KR | 10-2019-0077928 A | | 7/2019 |
| KR | 10-2019-0078001 A | | 7/2019 |
| KR | 10-2019-0078013 A | | 7/2019 |
| KR | 10-2019-0078438 A | | 7/2019 |
| WO | 2017/017483 A1 | | 2/2017 |
| WO | 2018/179395 A1 | | 10/2018 |

OTHER PUBLICATIONS

Indian Office Action dated Nov. 14, 2022 issued in Indian Patent Application No. 202217037417 (with English translation).

International Search Report dated Jun. 2, 2021 issued in International Patent Application No. PCT/KR2020/018692 (with English translation).

Japanese Office Action dated May 16, 2023 issued in Japanese Patent Application No. 2022-536760.

* cited by examiner

ALUMINUM ALLOY-PLATED STEEL SHEET HAVING EXCELLENT WORKABILITY AND CORROSION RESISTANCE AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/018692, filed on Dec. 18, 2020, which in turn claims the benefit of Korean Application No. 10-2019-0172362, filed on Dec. 20, 2019, the entire disclosures of which applications are incorporated by reference herein.

TECHNICAL FIELD

The present disclosure relates to an aluminum alloy-plated steel sheet having excellent workability and corrosion resistance and a method for manufacturing the same.

BACKGROUND ART

In the related art, an aluminum (Al)-plated steel sheet or a zinc (Zn)-plated steel sheet has been used for hot forming, but there is a problem in that microcracks may be generated or corrosion resistance is deteriorated due to an alloy phase formed during heat treatment. In addition, in the aluminum (Al)-plated steel sheet or the zinc (Zn)-plated steel sheet, a plated layer may be liquefied during the hot forming and the liquefied plated layer may be fused to a roll, and thus, the temperature may not be rapidly increased to 900° C., resulting in a deterioration of productivity. In addition, in the case of the aluminum-plated steel sheet, since there is no sacrificial corrosion resistance of aluminum, corrosion resistance after processing may be problematic.

In order to improve corrosion resistance and hot formability, an aluminum alloy-plated steel sheet obtained by controlling a content of Si in a plating bath to 4% or less and alloying a plated layer at an alloying temperature of 700° C. for an alloying time of 20 seconds is disclosed in the related art.

However, since a long alloying time of 20 seconds is required under the above conditions, it is difficult to perform an alloying treatment in an actual line, and significant cooling is required after alloying. In addition, as the content of Si is decreased, the temperature of the plating bath is about 700° C., which is significantly high. Thus, durability of a structure such as a sink roll dipped in the plating bath is remarkably deteriorated.

In addition, after the plated layer is alloyed, the plated layer moves through many rolls until it finally reaches a pay-off reel. At this time, powdering occurs during the movement, resulting in attachment of the powdered plated layer to the roll.

(Patent Document 1) Korean Patent Laid-open Publication No. 1997-0043250

DISCLOSURE

Technical Problem

An aspect of the present disclosure is to provide an aluminum alloy-plated steel sheet preventing powdering occurring during alloying of an aluminum-plated layer and having excellent seizure resistance and corrosion resistance during hot forming, and a method for manufacturing the same.

An object of the present disclosure is not limited to the above description. Those skilled in the art to which the present disclosure pertains will have no difficulties in understanding additional objects of the present disclosure from the general contents of the specification of the present disclosure.

Technical Solution

According to an aspect of the present disclosure, an aluminum alloy-plated steel sheet includes:
a base steel sheet;
an alloy-plated layer formed on the base steel sheet; and
an unalloy-plated layer formed on the alloy-plated layer,
wherein the alloy-plated layer contains, by wt %, 35 to 50% of Fe, 1 to 20% of Zn, 0.1 to 1.5% of Si, and a balance of Al and unavoidable impurities,
the unalloy-plated layer contains, by wt %, 1 to 30% of Zn, 0.1 to 1.8% of Si, and a balance of Al and unavoidable impurities, and
an interface roughness between the alloy-plated layer and the base steel sheet is 2.5 μm or less.

According to another aspect of the present disclosure, a method for manufacturing an aluminum alloy-plated steel sheet used for hot press forming includes:
preparing a base steel sheet;
dipping the base steel sheet in an aluminum plating bath that contains, by wt %, 3 to 30% of Zn, 0.1 to 1.5% of Si, and a balance of Al and unavoidable impurities to obtain an aluminum-plated steel sheet;
performing cooling by supplying air heated to 200 to 300° C. to the aluminum-plated steel sheet after the aluminum plating to form an oxide film on a surface of the aluminum-plated steel sheet; and
obtaining an aluminum alloy-plated steel sheet by on-line alloying in which a heat treatment is performed continuously after the cooling while maintaining the aluminum-plated steel sheet in a heating temperature range of 550° C. or higher and lower than 650° C. for 1 to 20 seconds.

According to another aspect of the present disclosure, there is provided a hot-formed member obtained by subjecting the aluminum alloy-plated steel sheet to hot press forming.

Advantageous Effects

As set forth above, according to the present disclosure, it is possible to provide an aluminum alloy-plated steel sheet preventing powdering occurring during alloying of an aluminum-plated layer and has excellent seizure resistance and corrosion resistance during hot forming, and a method for manufacturing the same.

BEST MODE FOR INVENTION

In the related art, a large amount of Si is added to an aluminum plating bath to form a dense Fe—Al—Si alloy phase in a plated layer, such that diffusion of base iron into the plated layer is suppressed. Therefore, a high alloying temperature and a long alloying time are required.

In order to solve this problem, there is an attempt to perform on-line alloying by limiting a content of Si to a range of 0.5 to 4%. However, an Al—Fe alloy phase is quickly formed and a melting point of the plated layer is increased, as the content of Si is decreased. The diffusion of Fe of the base iron into the plated layer is suppressed due to this. Thus, it is difficult to perform alloying on-line. In addition, in a case where the plated layer is alloyed by such a method, stress is generated by a roll due to a brittle alloy phase during working, which causes powdering.

In order to solve such a problem, as a result of examining an example, the plated layer is configured to include two layers of an alloy phase that is partially alloyed (alloy-plated layer) and an unalloy phase that is not alloyed (unalloy-plated layer, Al-plated layer). At the same time, it is found that the technical problems of the related art described above are solved by controlling an interface roughness between the alloy-plated layer and the base steel sheet to a specific range, such that powdering does not occur during on-line working, the steel sheet may be stably manufactured, and heat resistance and corrosion resistance may be improved by an alloy phase formed in the plated layer, thereby completing the present disclosure.

Therefore, according to the present disclosure, it is possible to effectively provide an aluminum alloy-plated steel sheet that may implement alloying of the plated layer in a relatively short time of 20 seconds or shorter, has excellent seizure resistance and corrosion resistance and excellent adhesion of the plated layer, and has improved powdering resistance.

Hereinafter, the present disclosure will be described in detail. First, an aluminum alloy-plated steel sheet according to an aspect of the present disclosure will be described in detail.

[Aluminum Alloy-Plated Steel Sheet]

That is, according to an aspect of the present disclosure, there is provided an aluminum alloy-plated steel sheet including:

a base steel sheet;
an alloy-plated layer formed on the base steel sheet; and
an unalloy-plated layer formed on the alloy-plated layer,
wherein the alloy-plated layer contains, by wt %, 35 to 50% of Fe, 1 to 20% of Zn, 0.1 to 1.5% of Si, and a balance of Al and unavoidable impurities,
the unalloy-plated layer contains, by wt %, 1 to 30% of Zn, 0.1 to 1.8% of Si, and a balance of Al and unavoidable impurities, and
an interface roughness between the alloy-plated layer and the base steel sheet is 2.5 μm or less.

That is, the aluminum alloy-plated steel sheet according to an aspect of the present disclosure may include a base steel sheet and an alloy-plated layer formed on the base steel sheet, and the alloy-plated layer may be formed on one or both surfaces of the base steel sheet. In addition, according to an aspect of the present disclosure, the unalloy-plated layer may be formed on the alloy-plated layer. Therefore, in the aluminum alloy-plated steel sheet, the unalloy-plated layer may be provided on at least one surface of the base steel sheet, and the alloy-plated layer may be provided between the base steel sheet and the unalloy-plated layer.

Hereinafter, the alloy-plated layer and the unalloy-plated layer will be separately described, and the alloy-plated layer will be first described.

According to an aspect of the present disclosure, the alloy-plated layer has a composition that contains, by wt %, 35 to 50% of Fe, 1 to 20% of Zn, 0.1 to 1.5% of Si, and a balance of Al and unavoidable impurities, and the unalloy-plated layer has a composition that contains, by wt %, 1 to 30% of Zn, 0.1 to 1.5% of Si, and a balance of Al and unavoidable impurities.

According to an aspect of the present disclosure, in the alloy-plated layer, Zn plays an important role in improving the adhesion of the alloy-plated layer after alloy treatment, as well as improving seizure resistance and corrosion resistance of the plated steel sheet. Therefore, according to an aspect of the present disclosure, a content of Zn in the alloy-plated layer is preferably 1 to 20%, when the content of Zn in the alloy-plated layer is less than 1%, the effect of corrosion resistance is not obtained, and when the content of Zn in the alloy-plated layer exceeds 20%, seizure resistance is deteriorated.

In addition, according to an aspect of the present disclosure, a content of Si in the alloy-plated layer is preferably 0.1 to 1.5%, when the content of Si in the alloy-plated layer is less than 0.1%, the interface roughness between the alloy-plated layer and the base steel sheet is too large, which is problematic for securing the adhesion of the plated layer. When the content of Si in the alloy-plated layer exceeds 1.5%, it is not preferable because diffusion of Fe into the base iron may be suppressed by solid dissolution of Si in an Fe—Al alloy phase and an alloying temperature may thus be increased.

In addition, according to an aspect of the present disclosure, the alloy-plated layer may optionally further contain Mn because after the base steel sheet is dipped and plated in an aluminum plating bath, Mn, which is a component contained in the base steel sheet, is introduced into the plated layer by alloy heat treatment. As the result of such diffusion, the alloy-plated layer of the aluminum alloy-plated steel sheet may further contain 2% or less of Mn. An upper limit of the content of Mn is preferably 2% or less in terms of securing the plating adhesion. Mn is an element substituting Fe in formation of the Al—Fe alloy phase and plays a role in improving adhesion to the base iron. However, when the content of Mn is 2% or more, the Al—Fe alloy phase is formed into a dense Al—Fe(Mn) phase, which may delay the alloying. In addition, since the content of Mn in the alloy-plated layer may be 0%, a lower limit thereof is not specifically limited.

In addition, according to an aspect of the present disclosure, a component such as Fe contained in the base steel sheet is diffused by the alloy treatment described above. Therefore, a content of Fe in the alloy-plated layer is preferably 35 to 50%. When the composition described above is satisfied, the seizure resistance and the corrosion resistance desired in the present disclosure may be secured, and the powdering resistance may be secured.

In addition, according to an aspect of the present disclosure, a content of Al in the alloy-plated layer is preferably 30 to 65% in terms of achieving the object of the present disclosure, and is more preferably 31.4 to 63.5%. When the content of Al in the alloy-plated layer is 30% or more, an Fe—Al alloy phase having a high melting point is formed, such that seizure and generation of microcracks are suppressed. However, when the content of Al in the alloy-plated layer exceeds 65%, the melting point is decreased due to formation of an Al-based alloy phase, resulting in deterioration of the seizure resistance during heat treatment.

In addition, according to an aspect of the present disclosure, a thickness of the alloy-plated layer may be 5 to 25 µm. When the thickness of the alloy-plated layer is 5 µm or more, the corrosion resistance may be secured, and when the thickness of the alloy-plated layer is 25 µm less, weldability may be secured. Therefore, in the present disclosure, the thickness of the alloy-plated layer is preferably 5 to 25 µm and more preferably 10 to 25 µm.

Meanwhile, according to an aspect of the present disclosure, as for the alloy-plated layer, a component such as Fe (or Mn) contained in the base steel sheet is diffused into an aluminum-plated layer by the alloy heat treatment after the plating. As a result, an alloy-plated layer mainly formed of an intermetallic compound of Fe and Al may be formed. The alloy-plated layer may be mainly formed of the Fe—Al intermetallic compound, and elements such as Zn, Mn, Si, and the like may be solid-dissolved in the alloy-plated layer. Specifically, the alloy-plated layer may contain 80% or more of the Fe—Al intermetallic compound such as $FeAl_3$ or $Fe_2Al_5$ (that is, the alloy-plated layer may contain 80% or more of one or more alloy phases selected from the group consisting of $FeAl_3$ and $Fe_2Al_5$ in terms of phase fraction, which may be confirmed by phase analysis of the aluminum alloy-plated steel sheet using X-ray diffraction (XRD)), and more preferably, may contain 90% or more of the Fe—Al intermetallic compound. In addition, according to an aspect of the present disclosure, the alloy-plated layer may be formed of an alloy phase in which Zn, Mn, and/or Si, and the like are solid-dissolved based on the Fe—Al intermetallic compound.

In addition, according to an aspect of the present disclosure, the interface roughness between the alloy-plated layer and the base steel sheet may be 2.5 µm or less and may be more preferably 0.03 to 2.5 µm. Therefore, a preferred adhesion of the plated layer may be secured. Meanwhile, in the present specification, the interface roughness (Ra) refers to an average value obtained by arithmetically calculating degrees of deviation in displacement of an interface formed between the alloy-plated layer and the base steel sheet from the profile central line as shown in the following Equation 1. Therefore, the interface roughness mathematically corresponds to a height (amplitude) of a rectangle having an area equal to the sum of areas of all peaks and valleys of a roughness curve. In this case, the interface roughness (Ra) may be measured by capturing an image of a cross section of the aluminum alloy-plated steel sheet in a thickness direction (refers to a direction perpendicular to a rolling direction) with a scanning electron microscope (SEM) and observing the interface between the alloy-plated layer and the base steel sheet.

$$Ra = \frac{1}{l}\int_0^l |Z(x)|dx \qquad \text{[Equation 1]}$$

(In Equation 1, Ra represents the surface roughness between the alloy-plated layer and the base steel sheet, l represents the entire length of an interface line to be measured, and Z(x) is a function representing a change in position of the interface line according to a length direction of the x-axis.)

Meanwhile, although not particularly limited, according to an aspect of the present disclosure, an interface roughness (Ra') between the alloy-plated layer and the unalloy-plated layer may be measured in the same method described above, and the interface roughness (Ra') between the alloy-plated layer and the unalloy-plated layer may be greater than the interface roughness (Ra) between the alloy-plated layer and the base steel sheet. Specifically, Ra' may be 1.02 to 2 times greater than Ra. Therefore, the adhesion of the plated layer may be further improved.

Meanwhile, according to an aspect of the present disclosure, the unalloy-plated layer is formed on the alloy-plated layer, and the unalloy-plated layer contains, by wt %, 1 to 30% of Zn, 0.1 to 1.8% of Si, and a balance of Al and unavoidable impurities. As described above, the unalloy-plated layer is formed on the alloy-plated layer, such that a relatively soft plated layer is formed on a surface of the steel sheet. Therefore, powdering caused by stress generated by a roll due to a brittle alloy phase during working may be prevented.

In addition, according to an aspect of the present disclosure, the content of Zn in the unalloy-plated layer may be higher than the content of Zn in the alloy-plated layer, or the content of Si in the unalloy-plated layer may be equal to or higher than the content of Si in the alloy-plated layer. Alternatively, the content of Al in the unalloy-plated layer may be higher than the content of Al in the alloy-plated layer. When the composition described above is satisfied, the powdering resistance may be improved.

In addition, according to an aspect of the present disclosure, the content of Zn in the unalloy-plated layer may be 1.5 to 30%, or the content of Al in the unalloy-plated layer may be 65 to 98.9%.

In addition, according to an aspect of the present disclosure, a thickness of the unalloy-plated layer is preferably 0.5 to 15 µm and more preferably 1 to 12 µm, and the thickness of the unalloy-plated layer may be equal to or less than a thickness of the alloy-plated layer.

In addition, according to an aspect of the present disclosure, the thickness of the alloy-plated layer may be 50% or more of the entire thickness of the alloy-plated layer and the unalloy-plated layer, and more preferably, may be 50 to 95% of the entire thickness of the alloy-plated layer and the unalloy-plated layer. By satisfying this, a plated steel sheet for hot press forming that has further improved seizure resistance, corrosion resistance, powdering resistance, and productivity may be provided.

According to an aspect of the present disclosure, a fraction of the Fe—Al intermetallic compound in the entire plated layer is preferably 50% or more and more preferably 70% or more.

When the fraction of the alloy phase described above is satisfied, the seizure resistance, the corrosion resistance, and the powdering resistance may be improved. According to an aspect of the present disclosure, the thickness of the unalloy-plated layer may be less than the thickness of the alloy-plated layer, which may improve the powdering resistance.

In addition, according to an aspect of the present disclosure, the above-described base steel sheet included in the plated steel sheet is a steel sheet for hot press forming, and is not particularly limited as long as it is used for hot press forming. However, as a non-limiting example, a steel sheet containing 1 to 10% of Mn may be used as the base steel sheet. Alternatively, abase steel sheet having a composition that contains, by wt %, 0.05 to 0.3% of C, 0.1 to 1.5% of Si, 0.5 to 8% of Mn, 50 ppm or less of B, and a balance of Fe and unavoidable impurities may be used as the base steel sheet.

That is, according to the present disclosure, it is possible to provide an aluminum alloy-plated steel sheet that may prevent seizure of the plated layer to be attached to a press die or a roll, which is generated during the hot forming, and may have excellent corrosion resistance and excellent adhesion of the plated layer.

[Method for Manufacturing Aluminum Alloy-Plated Steel Sheet]

Hereinafter, an example of a method for manufacturing an aluminum alloy-plated steel sheet used for hot press forming according to an aspect of the present disclosure will be described. However, the following method for manufacturing an aluminum alloy-plated steel sheet for hot press forming is merely one example, and the aluminum alloy-plated steel sheet for hot press forming of the present disclosure does not necessarily have to be manufactured by the present manufacturing method.

Specifically, according to another aspect of the present disclosure, there is provided a method for manufacturing an aluminum alloy-plated steel sheet used for hot press forming, the method including:

preparing a base steel sheet;

dipping the base steel sheet in an aluminum plating bath that contains, by wt %, 3 to 30% of Zn, 0.1 to 1.5% of Si, and a balance of Al and unavoidable impurities to obtain an aluminum-plated steel sheet;

performing cooling by supplying air heated to 200 to 300° C. to the aluminum-plated steel sheet after the aluminum plating to form an oxide film on a surface of the aluminum-plated steel sheet; and obtaining an aluminum alloy-plated steel sheet by on-line alloying in which a heat treatment is performed continuously after the cooling while maintaining the aluminum-plated steel sheet in a heating temperature range of 550° C. or higher and lower than 650° C. for 1 to 20 seconds.

First, a base steel sheet is prepared to manufacture an aluminum alloy-plated steel sheet. The same description may apply to the base steel sheet.

Subsequently, before performing the following plating, the base steel sheet may be subjected to heat treatment at 650 to 850° C., but is not particularly limited. The heat treatment is performed at a temperature equal to or higher than a recrystallization temperature to prevent processing hardening of a material in a continuous plating process and to maintain the base steel sheet at a temperature higher than that of the plating bath so as to improve plating properties. When the heat treatment temperature is lower than 650° C., deformation and meandering of the material due to processing hardening may occur during passing through a roll in a continuous process. Alternatively, when the heat treatment temperature is higher than 850° C., Mn and Si present in the base steel sheet are concentrated in the surface of the base steel sheet to form an oxide, which may cause deterioration of plating properties. Therefore, before the plating, the heat treatment temperature of the base steel sheet may be controlled to 650 to 850° C., and more preferably, before the plating, a lower limit of the heat treatment temperature of the base steel sheet may be 680° C., and an upper limit of the heat treatment temperature of the base steel sheet may be 830° C.

Next, the aluminum-plated steel sheet according to an aspect of the present disclosure may be obtained by subjecting a surface of the base steel sheet to hot-dip aluminum plating using an aluminum plating bath that contains, by wt %, 3 to 30% of Zn, 0.1 to 1.5% of Si, and a balance of Al and unavoidable impurities, and performing on-line alloy treatment in which cooling is performed continuously after the plating process and then heat treatment is immediately performed.

Specifically, the plating may be performed by dipping the base steel sheet in a hot-dip aluminum plating bath, and the composition of the plating bath may contain 3 to 30% of Zn, 0.1 to 1.5% of Si, and a balance of Al and unavoidable impurities, and more preferably, may contain 5 to 30% of Zn, 0.1 to 1.5% of Si, and a balance of Al and unavoidable impurities. Alternatively, according to an aspect of the present disclosure, the hot-dip aluminum plating bath may contain 5 to 30% of Zn, 0.1 to 0.5% of Si, and a balance of Al and unavoidable impurities.

According to an aspect of the present disclosure, it is preferable that the aluminum plating bath contains, by wt %, 3 to 30% of Zn to be added. When a content of Zn exceeds 30%, dust and the like are generated due to a large amount of ash generated in the plating bath, which causes deterioration of workability. In addition, when the content of Zn is less than 3%, a melting point of the plating bath is not significantly decreased, and Zn is evaporated during alloying, such that Zn does not remain in the plated layer and the corrosion resistance is not improved. However, in order to maximize the effect of the present disclosure, a lower limit of the content of Zn is preferably 5%, and an upper limit of the content of Zn is more preferably 20%.

In addition, according to an aspect of the present disclosure, it is preferable that the aluminum plating bath contains, by wt %, 0.1 to 1.5% of Si to be added. When a content of Si in the aluminum plating bath is less than 0.1%, the interface roughness between the alloy-plated layer and the base steel sheet is too large, and thus, the effect of improving the plating adhesion is not obtained. When the content of Si in the aluminum plating bath exceeds 1.5%, the diffusion of Fe into the base iron is suppressed due to solid dissolution of Si in the Fe—Al alloy phase, resulting in an increase in alloying temperature.

Meanwhile, according to an aspect of the present disclosure, it is preferable that the temperature of the plating bath is managed to a temperature higher than the melting point (Tb) of the plating bath by about 20 to 50° C. (that is, Tb+20° C. or higher and Tb+50° C. or lower). When the temperature of the plating bath is controlled to Tb+20° C. or higher, a deposition amount of plating may be controlled due to fluidity of the plating bath, and when the temperature of the plating bath is controlled to Tb+50° C. or lower, corrosion of a structure in the plating bath may be prevented.

In addition, according to an aspect of the present disclosure, a plating weight (deposition amount on the plated layer per surface) in the plating may be 20 to 100 g/m$^2$ per surface, and may be controlled by dipping the base steel sheet in the hot-dip aluminum plating bath and applying an air wiping process. When the plating weight in the plating is 20 g/m$^2$ or more per surface, the effect of the corrosion resistance may be exhibited, and when the plating weight in the plating is 100 g/m$^2$ or less per surface, the plated layer may be entirely alloyed.

Subsequently, cooling may be performed by supplying air heated to 200 to 300° C. to the aluminum-plated steel sheet after the aluminum plating to form an oxide film on a surface of the aluminum-plated steel sheet. The cooling is important in the present disclosure in that it is a means for forming a uniform alloy layer. That is, when performing cooling, air heated to 200 to 300° C. is supplied to the aluminum-plated steel sheet to expose the aluminum-plated steel sheet to the air, such that an oxide film (aluminum oxide film: $AlO_x$) is formed on the surface of the aluminum-plated steel sheet.

According to an aspect of the present disclosure, as described above, before alloy treatment, an oxide film may be formed on the surface of the aluminum-plated steel sheet at a thickness of 10% or more (more preferably 10% or more and 20% or less) of the entire thickness of the hot-dip aluminum-plated layer. As described above, the oxide film is formed at the thickness of 10% or more, such that volatilization of Zn contained in the plated layer may be prevented during the alloy treatment. Therefore, excellent seizure resistance and corrosion resistance and excellent adhesion of the plated layer may be secured.

Next, on-line alloy treatment in which a heat treatment is immediately performed continuously after the cooling described above may be performed. Fe and/or Mn in the base steel sheet is diffused into the aluminum-plated layer by such alloy heat treatment, such that the alloy-plated layer may be formed.

Specifically, in the present disclosure, the alloy treatment temperature may be 550° C. or higher and lower than 650° C., and the maintaining time may be 1 to 20 seconds. In the present disclosure, the on-line alloy treatment refers to a process of performing heat treatment by increasing the temperature after the hot-dip aluminum plating. In the on-line alloy heat treatment method according to the present disclosure, the heat treatment for alloying is started before the plated layer is cooled and hardened after the hot-dip aluminum plating, and thus, the alloying may be performed in a short time. In a plated layer component system of an aluminum-plated steel sheet known in the related art, sufficient alloying is not completed in a short time because an alloying rate is slow, and thus, it is difficult to apply the on-line alloying method in which a heat treatment is performed immediately after the plating. However, in the present disclosure, the composition, manufacturing conditions, and the like of the plating bath that affect the alloying rate are controlled, such that the aluminum-plated layer may be alloyed in spite of a relatively short heat treatment time of 1 to 20 seconds.

According to an aspect of the present disclosure, the alloy heat treatment temperature may be 550° C. or higher and lower than 650° C. The alloy heat treatment temperature is based on a temperature of the surface of the steel sheet to be subjected to heat treatment, and when the alloy heat treatment temperature is lower than 550° C., 50% or less of the alloy phase may be formed in the plated layer. When the alloy heat treatment temperature is 650° C. or higher, the plated layer is fully alloyed, which may cause powdering.

In addition, according to an aspect of the present disclosure, the maintaining time during the alloy heat treatment may be in a range of 1 to 20 seconds. In the present disclosure, the maintaining time during the alloy heat treatment refers to a time during which the heating temperature (including a deviation of ±10° C.) is maintained in the steel sheet. When the maintaining time is 1 second or longer, the alloying may be sufficient, and when the maintaining time is 20 seconds or shorter, productivity may be secured.

In addition, according to an aspect of the present disclosure, in the plated steel sheet manufactured by the present disclosure, the content of Fe in the alloy-plated layer may be represented by the following Relational Expression 1, and the heat treatment temperature and the contents of Zn and Si in the plating bath during the alloying are controlled to appropriate ranges, such that excellent seizure resistance and corrosion resistance and/or adhesion of the plated layer may be easily exhibited.

$$160-0.41\times[T]+3.35\times10^{-4}\times[T^2]-0.3\times[wt\%\ Zn]-3\times[wt\%\ Si]\leq[wt\%\ Fe]\leq180-0.41\times[T]+3.35\times10^{-4}\times[T^2]-0.3\times[wt\%\ Zn]-3\times[wt\%\ Si] \quad \text{[Relational Expression 1]}$$

[In Relational Expression 1, [T] represents the alloy heat treatment temperature (° C.), [wt % Zn] represents the content of Zn wt % in the plating bath, [wt % Si] represents the content of Si wt % in the plating bath, and [wt % Fe] represents the content of Fe wt % in the alloy-plated layer.]

According to an aspect of the present disclosure, in order to further improve the effect of the present disclosure, a lower limit of the maintaining time during the alloy heat treatment may be 2 seconds, and more preferably, may be 5 seconds. Similarly, an upper limit of the maintaining time during the alloy heat treatment may be 15 seconds, and more preferably, may be 10 seconds.

As described above, the diffusion of Fe is suppressed by containing Si in the related art, such that the alloying is not performed in a short time of 20 seconds or shorter. On the other hand, according to the present disclosure, the composition of the plating bath and the conditions during the alloy heat treatment are controlled, such that the alloying may be performed in a relatively short time of 20 seconds or shorter.

Meanwhile, the method for manufacturing an aluminum alloy-plated steel sheet according to an aspect of the present disclosure may further include, after the alloy treatment, performing cooling.

According to an aspect of the present disclosure, the cooling may be performed to 300° C. or lower at an average cooling rate of 5 to 50° C./s based on the temperature of the surface of the steel sheet. Meanwhile, the cooling may be air cooling or mist cooling, and according to an aspect of the present disclosure, the cooling may be most preferably mist cooling.

Meanwhile, according to an aspect of the present disclosure, more preferably, when the average cooling rate is set to 10 to 30° C./s, the cooling may be performed using the existing hot-dip plating line in on-line without additional facilities. In addition, according to an aspect of the present disclosure, the cooling may be performed for 5 to 20 seconds, and when the cooling time is set to 10 seconds or longer, the cooling effect may be sufficiently exhibited.

In addition, according to another aspect of the present disclosure, there is provided a hot-formed member obtained by subjecting the aluminum alloy-plated steel sheet to hot press forming.

Methods generally used in the art may be used in the hot press forming. For example, the plated steel sheet may be heated in a temperature range of 800 to 950° C. for 3 to 10 minutes, and then, the plated steel sheet may be subjected to hot forming into a desired shape using a press, but the present disclosure is not limited thereto.

In addition, a composition of a base steel sheet of the hot press-formed member may be the same as the composition of the base steel sheet described above.

MODE FOR INVENTION

Hereinafter, the present disclosure will be described in more detail with reference to Examples. However, the following Examples are provided to illustrate and describe the present disclosure in detail, but are not intended to limit the scope of the present disclosure. This is because the scope of the present disclosure is determined by contents disclosed in the claims and contents reasonably inferred therefrom.

Examples

First, after a cold-rolled steel sheet for hot-press forming having the composition shown in Table 1 and a thickness of 1.2 mm was prepared as a base steel sheet, the base steel sheet was dipped and ultrasonically cleaned to remove substances such as rolling oil present on a surface.

TABLE 1

| Element | C | Si | Mn | Ti | B | Fe |
|---|---|---|---|---|---|---|
| Content (wt %) | 0.22% | 0.25% | Mn: 1.3% | 0.03% | 25 ppm | bal |

Thereafter, the base steel sheet was subjected to heat treatment in a furnace maintained in a reducing atmosphere at an annealing temperature of 800° C. for an annealing time of 50 seconds, and then, the base steel sheet was dipped in a plating bath satisfying the composition containing 3 to 30% of Zn, 0.1 to 1.5% of Si, and a balance of Al and unavoidable impurities, thereby performing aluminum plating. When the base steel sheet was dipped in the plating bath, the dipping temperature was maintained at the same temperature of the plating bath, and the temperature of the plating bath was maintained at a temperature that was collectively increased by 40° C. with respect to a melting point of each plating component system. In order for comparison of alloying, the plating weight was constantly maintained at 60 g/m² per surface using air wiping.

TABLE 2

| | Composition of plating bath [wt %] | | | Alloying [° C.] | Alloying [sec] |
|---|---|---|---|---|---|
| Classification | Al | Zn | Si | temperature | time |
| Comparative Example 1 | bal | — | — | 720 | 15 |
| Comparative Example 2 | bal | 1.5 | 7.7 | 680 | 20 |
| Comparative Example 3 | bal | — | 2 | 700 | 15 |
| Comparative Example 4 | bal | 3 | 5.5 | 670 | 20 |
| Comparative Example 5 | bal | — | 2 | 680 | 15 |
| Comparative Example 6 | bal | 18 | 8.8 | 650 | 20 |
| Comparative Example 7 | bal | — | 2 | 680 | 10 |
| Comparative Example 8 | bal | 30 | 8.8 | 670 | 20 |
| Comparative Example 9 | bal | 37.5 | 9.9 | 680 | 15 |
| Comparative Example 10 | bal | — | 1.1 | 700 | 10 |
| Inventive Example 1 | bal | 1.5 | 0.1 | 620 | 5 |
| Inventive Example 2 | bal | 1.5 | 1.7 | 640 | 10 |
| Inventive Example 3 | bal | 7.5 | 0.11 | 630 | 5 |
| Inventive Example 4 | bal | 7.5 | 1.65 | 630 | 10 |
| Inventive Example 5 | bal | 22.5 | 0.1 | 600 | 5 |
| Inventive Example 6 | bal | 22.5 | 1.1 | 580 | 5 |
| Inventive Example 7 | bal | 22.5 | 1.7 | 630 | 5 |
| Inventive Example 8 | bal | 30 | 0.1 | 590 | 10 |
| Inventive Example 9 | bal | 30 | 1.1 | 610 | 7 |
| Inventive Example 10 | bal | 30 | 1.7 | 640 | 5 |

Subsequently, cooling was performed by supplying air heated to 200 to 300° C. to the aluminum-plated steel sheet, and the cooling was controlled to form an oxide film having a thickness of 10% of the entire thickness of the hot-dip aluminum-plated layer. Thereafter, alloy heat treatment was performed to manufacture the aluminum alloy-plated steel sheet shown in Table 2. Meanwhile, among the experimental examples of Table 3, in the example expressed by full alloying, the alloying was performed in a range of 650 to 750° C., and in the example expressed by partial alloying, the alloying was performed in a range of 550° C. or higher and lower than 650° C. Thereafter, the cooling was performed to 300° C. or lower by air cooling based on the temperature of the surface of the steel sheet to manufacture an aluminum alloy-plated steel sheet.

TABLE 3

| | Alloy-plated layer | | | | | | Unalloy-plated layer | | | | | |
|---|---|---|---|---|---|---|---|---|---|---|---|---|
| | Component | | | | | Thickness of alloy layer | Component | | | Thickness of unalloy layer | | Full alloying or partial alloying |
| Classification | Al | Zn | Mn | Fe | Si | [μm] | Al | Zn | Si | [μm] | Ra* | [Full/partial] | T* |
| Comparative Example 1 | bal | 1 | 0 | 46 | 0 | 10 | bal | — | — | — | 0.8 | Full alloying | 100% |
| Comparative Example 2 | bal | 1 | 2 | 50 | 7 | 30 | bal | 1.5 | 8.4 | 5 | 3.0 | Partial alloying | 86% |
| Comparative Example 3 | bal | 2 | 1 | 44 | 2 | 20 | bal | — | — | — | 1.2 | Full alloying | 100% |
| Comparative Example 4 | bal | 2 | 1 | 45 | 5 | 30 | bal | 3 | 6 | 5 | 1.2 | Partial alloying | 86% |
| Comparative Example 5 | bal | 10 | 3 | 47 | 2 | 20 | bal | — | — | — | 3.2 | Full alloying | 100% |
| Comparative Example 6 | bal | 12 | 2 | 39 | 8 | 5 | bal | 18 | 9.6 | 20 | 3.2 | Partial alloying | 20% |

TABLE 3-continued

|  | Alloy-plated layer | | | | | Unalloy-plated layer | | | | | |
|---|---|---|---|---|---|---|---|---|---|---|---|
|  | Component | | | | Thickness of alloy layer | Component | | | Thickness of unalloy layer |  | Full alloying or partial alloying |
| Classification | Al | Zn | Mn | Fe | Si | [μm] | Al | Zn | Si | [μm] | Ra* | [Full/partial] | T* |
| Comparative Example 7 | bal | 15 | 1 | 38 | 2 | 5 | bal | — | — | — | 0.6 | Full alloying | 100% |
| Comparative Example 8 | bal | 20 | 2 | 35 | 8 | 10 | bal | 30 | 9.6 | 20 | 0.6 | Partial alloying | 33% |
| Comparative Example 9 | bal | 25 | 3 | 36 | 9 | 10 | bal | 37.5 | 10.8 | 15 | 1.2 | Partial alloying | 40% |
| Comparative Example 10 | bal | 35 | 5 | 40 | 1 | 25 | bal | — | 1.2 | — | 0.4 | Full alloying | 100% |
| Inventive Example 1 | bal | 1 | 0.5 | 35 | 0.1 | 10 | bal | 1.5 | 0.1 | 10 | 1.2 | Partial alloying | 50% |
| Inventive Example 2 | bal | 1 | 0.3 | 50 | 1.5 | 20 | bal | 1.5 | 1.8 | 5 | 2.5 | Partial alloying | 80% |
| Inventive Example 3 | bal | 5 | 1 | 37 | 0.1 | 10 | bal | 7.5 | 0.12 | 5 | 2.0 | Partial alloying | 67% |
| Inventive Example 4 | bal | 5 | 0.5 | 48 | 1.5 | 20 | bal | 7.5 | 1.8 | 1 | 2.0 | Partial alloying | 95% |
| Inventive Example 5 | bal | 15 | 0.5 | 46 | 0.1 | 15 | bal | 22.5 | 0.1 | 1 | 0.8 | Partial alloying | 94% |
| Inventive Example 6 | bal | 15 | 0.1 | 42 | 1 | 15 | bal | 22.5 | 1.2 | 5 | 0.8 | Partial alloying | 75% |
| Inventive Example 7 | bal | 15 | 0.7 | 35 | 1.5 | 20 | bal | 22.5 | 1.8 | 6 | 0.4 | Partial alloying | 77% |
| Inventive Example 8 | bal | 20 | 1.5 | 47 | 0.1 | 12 | bal | 30 | 0.1 | 12 | 1.0 | Partial alloying | 50% |
| Inventive Example 9 | bal | 20 | 1 | 43 | 1 | 15 | bal | 30 | 1.2 | 10 | 1.0 | Partial alloying | 60% |
| Inventive Example 10 | bal | 20 | 2 | 36 | 1.5 | 25 | bal | 30 | 1.8 | 5 | 1.0 | Partial alloying | 83% |

Ra*: Interface Roughness [μm] between alloy-plated layer and base steel sheet
T*: Fraction [%] of thickness of alloy-plated layer to entire thickness of plated layers (alloy-plated layer and unalloy-plated layer)

In the aluminum alloy-plated steel sheet manufactured by the method described above, the content of each component in the alloy-plated layer and the thickness were measured. The results are shown in Table 3. The component in the alloy-plated layer was measured by a wet method using inductively coupled plasma spectroscopy (ICP), and the thickness was measured by observing a cross section of the alloy-plated layer with an electron microscope.

In addition, in order to evaluate properties of the aluminum alloy-plated steel sheet, seizure resistance, corrosion resistance, powdering resistance, and productivity were evaluated by the following methods. The evaluation results are shown in Table 4.

[Seizure Resistance]

The manufactured plated steel sheet was heated under a condition of 900° C. for 5 minutes to evaluate physical properties of the plating, and then, whether or not the alloy-plated layer was fused to a die was visually observed. The evaluation was performed based on the following criteria.

○: No seizure
 x: Occurrence of adsorption on die due to hot-dip of plated layer

[Corrosion Resistance]

After the salt spray test was performed for 720 hours, the corrosion product formed on the surface was removed, the depth of the corrosion product formed by the corrosion was measured, and a case where the depth was equal to or less than the standard (70 μm) as described below was expressed as good. The results are shown in Table 3.

○: 70 μm or less
 x: More than 70 μm

[Powdering Resistance]

Whether or not the plated layer was peeled off was evaluated using a 60° bending test. The results are shown in Table 3.

[Productivity]

The time required for the alloying was measured, and productivity was evaluated based on the following criteria.

○: Shorter than 15 seconds
 Δ: 15 seconds or longer and 20 seconds or shorter
 x: Longer than 20 seconds

TABLE 4

|  | Seizure resistance | Corrosion resistance | Powdering resistance | Productivity |
|---|---|---|---|---|
| Comparative Example 1 | ○ | ○ | X | Δ |
| Comparative Example 2 | ○ | ○ | X | Δ |
| Comparative Example 3 | ○ | ○ | X | Δ |
| Comparative Example 4 | ○ | ○ | X | Δ |
| Comparative Example 5 | ○ | ○ | X | Δ |
| Comparative Example 6 | X | X | ○ | Δ |
| Comparative Example 7 | ○ | X | X | ○ |
| Comparative Example 8 | X | ○ | ○ | Δ |
| Comparative Example 9 | X | ○ | ○ | Δ |
| Comparative Example 10 | ○ | ○ | X | ○ |

TABLE 4-continued

| | Seizure resistance | Corrosion resistance | Powdering resistance | Productivity |
|---|---|---|---|---|
| Inventive Example 1 | ○ | ○ | ○ | ○ |
| Inventive Example 2 | ○ | ○ | ○ | ○ |
| Inventive Example 3 | ○ | ○ | ○ | ○ |
| Inventive Example 4 | ○ | ○ | ○ | ○ |
| Inventive Example 5 | ○ | ○ | ○ | ○ |
| Inventive Example 6 | ○ | ○ | ○ | ○ |
| Inventive Example 7 | ○ | ○ | ○ | ○ |
| Inventive Example 8 | ○ | ○ | ○ | ○ |
| Inventive Example 9 | ○ | ○ | ○ | ○ |
| Inventive Example 10 | ○ | ○ | ○ | ○ |

As shown in Table 4, in Inventive Examples 1 to 10 in which the composition of the alloy-plated layer, the composition of the unalloy-plated layer, and the manufacturing conditions that were defined in the present disclosure were satisfied, it was confirmed that the effect of improving the seizure resistance, the corrosion resistance, the powdering resistance, and the productivity was excellent.

On the other hand, in Comparative Examples 1 to 10 in which any one of the composition of the alloy-plated layer, the composition of the unalloy-plated layer, and the manufacturing conditions that were defined in the present disclosure was not satisfied, any one of the seizure resistance, the corrosion resistance, the powdering resistance, and the productivity was not excellent.

Figure 1:
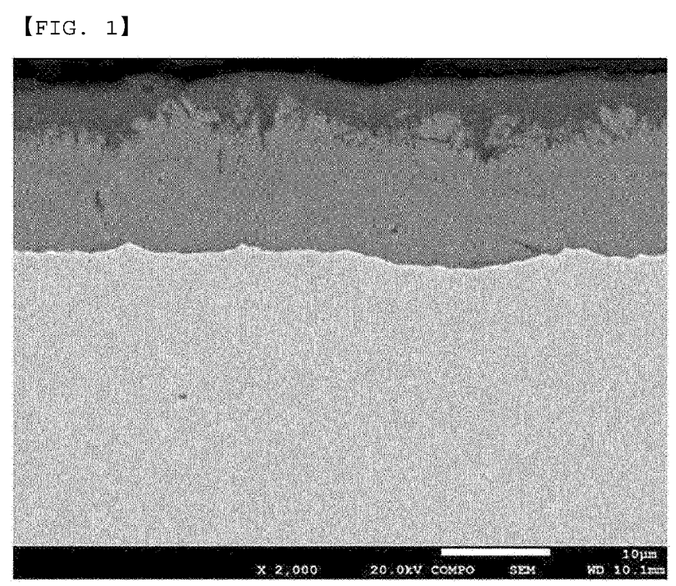
FIG. 1 is a photograph obtained by observing a cross section of an aluminum alloy-plated steel sheet manufactured by Inventive Example 1 with a scanning electron microscope (SEM).

In particular, the photograph obtained by observing the cross section of the aluminum alloy-plated steel sheet obtained in Inventive Example 1 with a scanning electron microscope (SEM) is illustrated in FIG. 1. It was confirmed that the surface roughness between the alloy-plated layer and the base steel sheet, which was measured from this, was 2.5 μm or less. Additionally, the interface roughness (Ra') between the alloy-plated layer and the unalloy-plated layer was measured by applying the same method as the measurement method of Ra. It was confirmed that the value of Ra' was 1.02 to 2 times greater than the value of Ra, which showed that Ra' was greater than the surface roughness (Ra) between the alloy-plated layer and the base steel sheet.

In addition, phase analysis was performed on the aluminum alloy-plated steel sheet obtained in Inventive Example 1 using X-ray diffraction (XRD), and it was confirmed that the alloy-plated layer formed on the base steel sheet contained 80% or more of one or more alloy phases selected from the group consisting of $Fe_2Al_5$ and $FeAl_3$ in terms of phase fraction.

Figure 2:
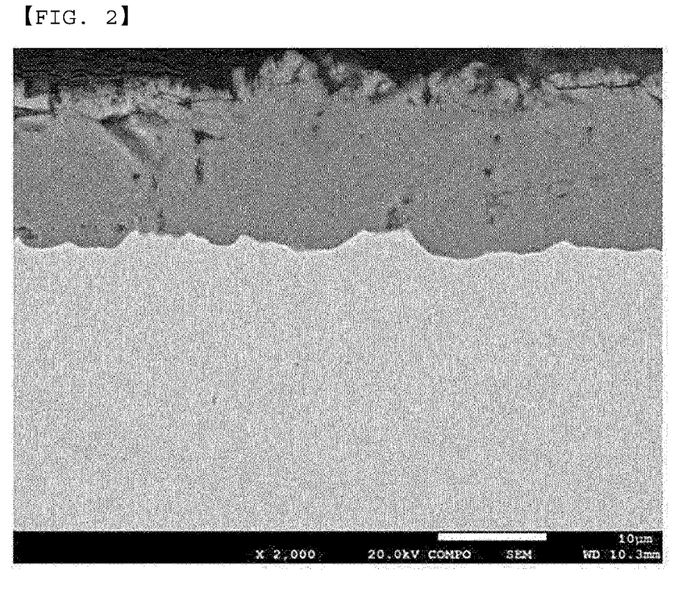
FIG. 2 is a photograph obtained by observing a cross section of an aluminum alloy-plated steel sheet manufactured by Comparative Example 1 with a scanning electron microscope (SEM).
Figure 3:
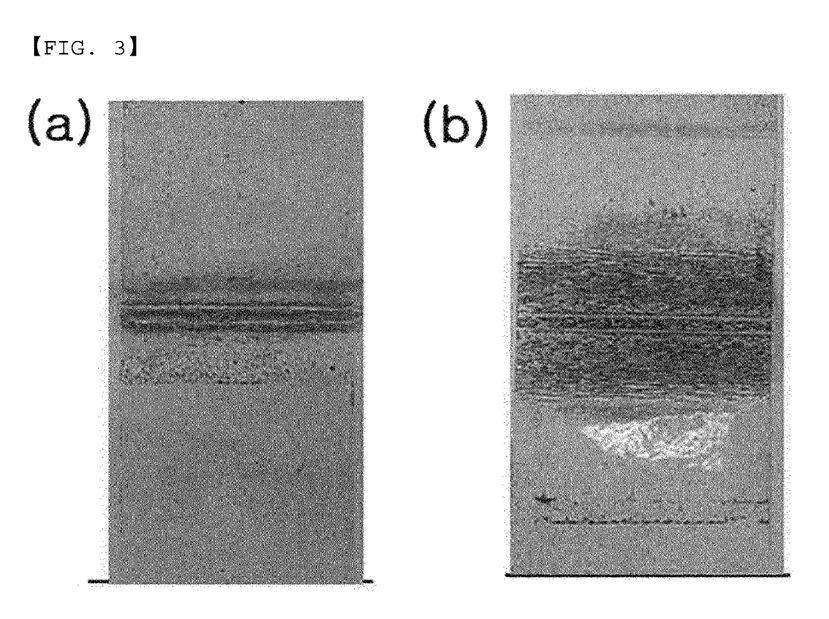
FIG. 3 is a photograph showing a result of evaluating powdering resistance of each of Inventive Example 1 and Comparative Example 1.

Meanwhile, the photograph obtained by observing the cross section of the aluminum alloy-plated steel sheet obtained in Comparative Example 1 with a scanning electron microscope is illustrated in FIG. 2. The surface roughness between the alloy-plated layer and the base steel sheet, which was measured from this, was more than 2.5 μm. The results of evaluating the powdering resistance of Inventive Example 1 and Comparative Example 1 are illustrated in FIG. 3. FIG. 3A illustrates Inventive Example 1 and FIG. 3B illustrates Comparative Example 1. Through the comparison of the experimental results, it was confirmed that the powdering resistance of Inventive Example 1 was improved in comparison to the powdering resistance of Comparative Example 1.

The invention claimed is:

1. An aluminum alloy-plated steel sheet comprising:
a base steel sheet;
an alloy-plated layer formed on the base steel sheet; and
an unalloy-plated layer formed on the alloy-plated layer,
wherein the alloy-plated layer contains, by wt %, 35 to 50% of Fe, 1 to 20% of Zn, 0.1 to 1.5% of Si, and a balance of Al and unavoidable impurities,
the unalloy-plated layer contains, by wt %, 1 to 30% of Zn, 0.1 to 1.8% of Si, and a balance of Al and unavoidable impurities, and
an interface roughness $R_a$, between the alloy-plated layer and the base steel sheet is 2.5 μm or less.

2. The aluminum alloy-plated steel sheet of claim 1, wherein a thickness of the alloy-plated layer is 5 to 25 μm, and
a thickness of the unalloy-plated layer is 1 to 12 μm.

3. The aluminum alloy-plated steel sheet of claim 1, wherein a content of Zn in the unalloy-plated layer is higher than a content of Zn in the alloy-plated layer.

4. The aluminum alloy-plated steel sheet of claim 1, wherein a thickness of the alloy-plated layer is 50% or more of the entire thickness of the alloy-plated layer and the unalloy-plated layer.

5. The aluminum alloy-plated steel sheet of claim 1, wherein the base steel sheet contains, by wt %, 0.05 to 0.3% of C, 0.1 to 1.5% of Si, 0.5 to 8% of Mn, 50 ppm or less of B, and a balance of Fe and unavoidable impurities.

6. The aluminum alloy-plated steel sheet of claim 1, wherein a content of Si in the alloy-plated layer is 0.1 to 0.5% in terms of wt %.

7. A hot-formed member obtained by subjecting the aluminum alloy-plated steel sheet of claim 1 to hot press forming.

8. A method for manufacturing an aluminum alloy-plated steel sheet used for hot press forming, the method comprising:
preparing a base steel sheet;
dipping the base steel sheet in an aluminum plating bath that contains, by wt %, 3 to 30% of Zn, 0.1 to 1.5% of Si, and a balance of Al and unavoidable impurities to obtain an aluminum-plated steel sheet;
performing cooling by supplying air heated to 200 to 300° C. to the aluminum-plated steel sheet after the aluminum plating to form an oxide film on a surface of the aluminum-plated steel sheet; and
obtaining an aluminum alloy-plated steel sheet by on-line alloying in which a heat treatment is performed after the cooling while maintaining the aluminum-plated steel sheet in a heating temperature range of 550° C. or higher and lower than 650° C. for 1 to 20 seconds.

9. The method of claim 8, further comprising, after the alloy treatment, performing cooling.

10. The method of claim 8, wherein a plating weight in the plating is 20 to 100 g/m² per surface.

11. The method of claim 9, wherein the cooling after the alloy treatment is air cooling.

12. The method of claim 8, wherein the oxide film is formed on the surface of the aluminum-plated steel sheet at a thickness of 10% or more of the entire thickness of a hot-dip aluminum-plated layer.

* * * * *